(No Model.) 2 Sheets—Sheet 2.
A. TAYLOR & N. BROOKE.
APPARATUS FOR MOLDING EARTHENWARE ARTICLES.
No. 452,202. Patented May 12, 1891.
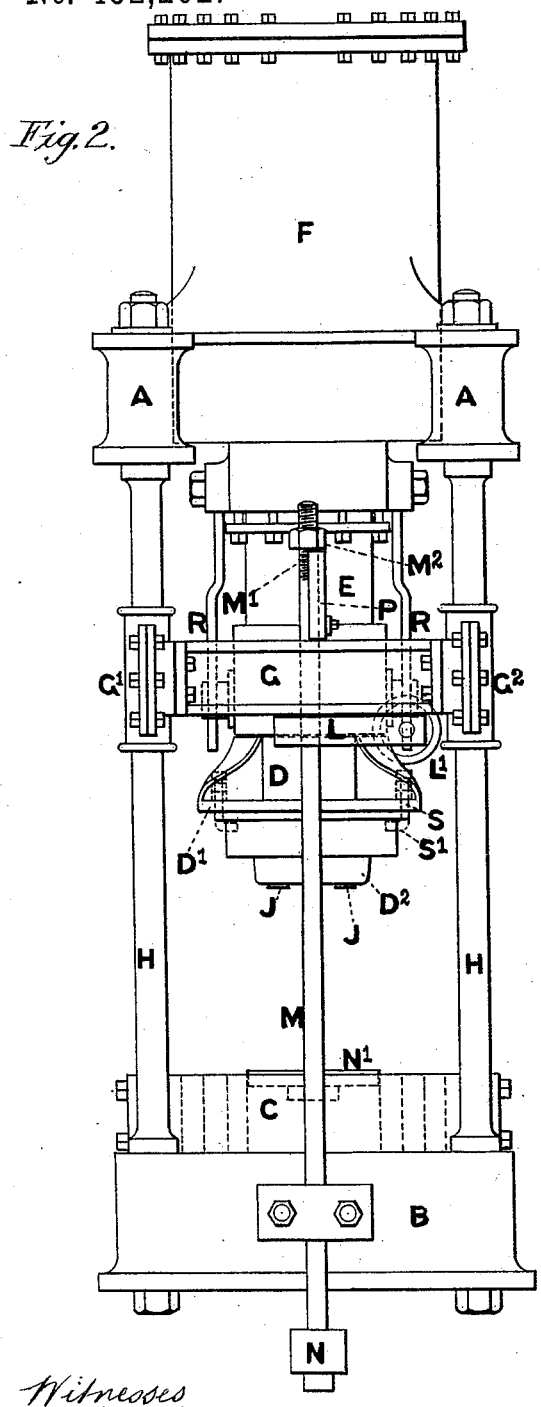
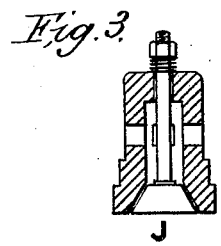
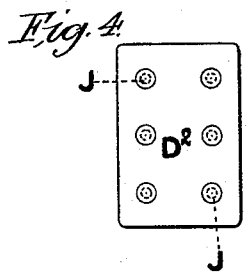
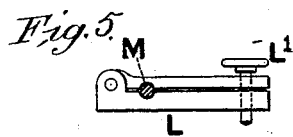
Witnesses
Abm Reed
John E Walsh
Inventors
Albert Taylor
Newton Brooke

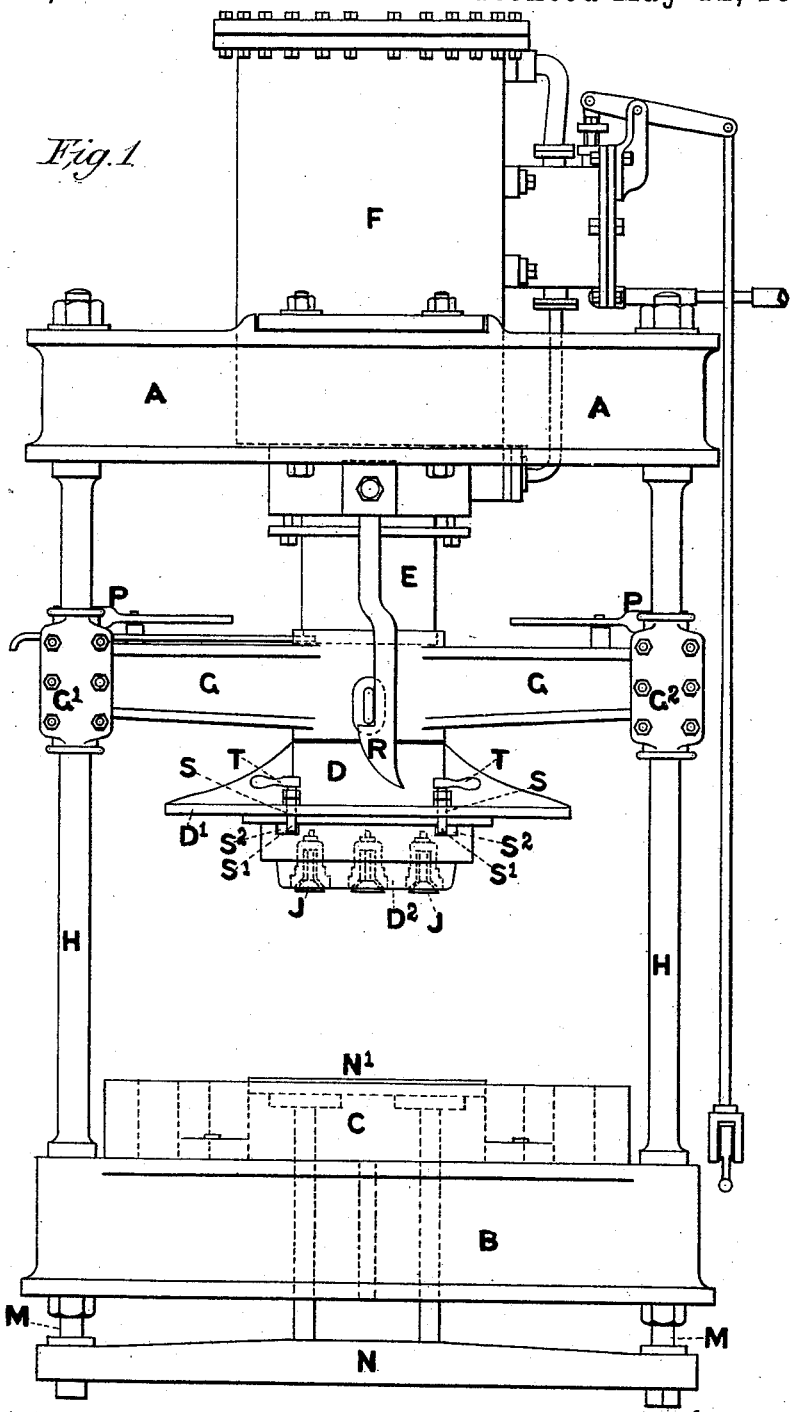

UNITED STATES PATENT OFFICE.

ALBERT TAYLOR AND NEWTON BROOKE, OF HIPPERHOLME, ENGLAND.

APPARATUS FOR MOLDING EARTHENWARE ARTICLES.

SPECIFICATION forming part of Letters Patent No. 452,202, dated May 12, 1891.

Application filed July 26, 1890. Serial No. 360,071. (No model.) Patented in England March 19, 1888, No. 4,204; in France April 4, 1888, No. 197,213; in Belgium April 4, 1888, No. 85,689, and in Austria-Hungary July 3, 1888, No. 28,836.

*To all whom it may concern:*

Be it known that we, ALBERT TAYLOR and NEWTON BROOKE, subjects of the Queen of Great Britain, residing at Hipperholme, in the county of York, England, have invented certain new and useful Improvements in Apparatus for Molding Vessels, (for which we have obtained Letters Patent in Great Britain, No. 4,204, dated March 19, 1888; in France, No. 197,213, dated April 4, 1888, and in Austria-Hungary, No. 28,836, dated July 3, 1888,) of which the following is a full, clear, and exact description.

This invention has for its object to provide a novel apparatus for molding earthenware and fire-clay vessels, such as bath-tubs, wash-tubs, sinks, mangers, basins, closet-bowls, and like hollow articles; and to such end the invention involves the features of construction, the combination or arrangement of devices, and the principles of operation hereinafter described and claimed, reference being made to the accompanying drawings, in which—

Figure 1 is a front elevation of our improved apparatus for molding and pressing earthenware baths, sinks, lavatory-basins, and the like appliances. Fig. 2 is an end view of Fig. 1. Fig. 3 is an enlarged view of air-valve in the top mold. Fig. 4 is a view of the face of the top mold. Fig. 5 is a plan of clip for securing the slide in any suitable position.

In a suitable frame-work A we fix a table B, upon which is placed the bottom mold or box C, of the required shape for the reception of fire-clay or like material of which the articles are to be made.

Above the mold or box C in suitable bearings is a plunger D with flange $D'$, to which is secured the top mold $D^2$ by means of two catches S at each side of the plunger. These catches S have projections $S'$, which engage with recesses $S^2$ in the top mold $D^2$ and secure it to the flange $D'$ of the plunger D. The plunger is attached to a piston rod or shaft E, upon which is a piston within a steam or other cylinder F. Secured to the piston-rod is a cross-head G, having sides $G'$ and $G^2$, working upon the guide-rods H.

The top mold $D^2$ is adjustable and corresponds to the shape of the bottom mold C, (one forming the inside and the other the outside of the article being made,) and is provided on its under side with a series of air-valves J, so constructed that on withdrawing the plunger D the valves automatically open and admit air, so as to allow of the withdrawal of the top mold without disturbing or injuring the article molded. After the plunger has been brought down upon the top mold and forced or plunged into the clay within the bottom mold the catches S and their projections $S'$ are disengaged from the recesses $S^2$, and the top mold-box is released and remains embedded in the clay within the bottom mold-box, while the plunger is raised by the steam-cylinder or other power and is again brought down with great force, striking the top mold-box. This is repeated the required number of times, (according to the bulk of the article being molded,) forcing the top mold-box into the bottom mold, compressing the clay therein, and so molding the article required.

Two clips L L are operated by a hand-wheel $L'$, fixed upon a stud on the cross-head G. The clips encircle a central guide-rod M at each end of the machine, attached to a cross-beam N, supporting a discharging-plate $N'$ for the bottom mold C, so that, if required, at the same time the plunger is withdrawn the article molded or pressed is also raised to the required position for removal. A loose wrought-iron or metallic plate may be employed upon the face of the bottom plate $N'$ for facilitating the removal of the articles being made.

Two clips P partly encircle the central rods M, and by means of the thread $M'$ and nut $M^2$ the length of the stroke of the piston-rod and plunger can be regulated by taking up or letting down the central rod M.

Upon each side of the plunger, attached to the cylinder F or frame A, are two catches R for holding up the plunger after it is withdrawn from pressing until again required.

A different size or shape of mold may be substituted by giving the handles T of the catches S a half-turn, so disengaging the projections $S'$ with the recesses $S^2$ and so allow the removal of the mold, and a fresh one can be substituted.

For ornamenting the outside of the articles molded we employ four or more corrugated or ornamented plates placed on each side of the bottom mold. By this means we simultaneously obtain the required corrugations or ornamentations upon the articles being pressed.

What we claim as our invention, and desire to secure by Letters Patent, is—

The combination, in an apparatus for molding vessels, of the table B, carrying the lower mold C and upright guide-rods H, the cross-beam N, provided with a discharging-plate N' for the lower mold, the cross-head G, moving on the guide-rods and having a plunger D, carrying a detachable top mold $D^2$, a cylinder F, having its piston-rod E connected with the cross-head, the center guide-rods M, connected at their lower ends to the cross-beam and having screw-threaded upper ends, the clips L, movably connecting the center guide-rods to the cross-head, and the clips P and nut $M^2$ for raising, lowering, and holding the center guide-rods in different positions to vary the strokes of the piston-rod and cross-head, substantially as described.

In testimony whereof we affix our signatures in presence of two witnesses.

ALBERT TAYLOR.
    NEWTON BROOKE.

Witnesses:
 ABM. REED,
  *Halifax.*
 JOHN E. WALSH,
  *Crossley Street, Halifax.*